United States Patent [19]

McDaniel et al.

[11] Patent Number: 5,032,651
[45] Date of Patent: Jul. 16, 1991

[54] METHOD FOR PRODUCING OLEFIN POLYMER BLENDS UTILIZING A CHROMIUM-ZIRCONIUM DUAL CATALYST SYSTEM

[75] Inventors: Max P. McDaniel, Bartlesville, Okla.; Paul D. Smith, Seabrook, Tex.

[73] Assignee: Phillips Petroleum Company, Bartlesville, Okla.

[21] Appl. No.: 530,157

[22] Filed: May 29, 1990

[51] Int. Cl.$^5$ .............................................. C08F 4/64
[52] U.S. Cl. ......................................... 526/96; 526/97; 526/352; 502/113; 502/154
[58] Field of Search .................... 526/96, 97, 113, 114

[56] References Cited

U.S. PATENT DOCUMENTS

| | | | |
|---|---|---|---|
| 4,056,669 | 11/1977 | Ballard et al. | 526/154 |
| 4,128,500 | 12/1978 | Hwang et al. | 252/430 |
| 4,285,834 | 8/1981 | Lowery, Jr. et al. | 252/429 |
| 4,364,841 | 12/1982 | McDaniel et al. | 252/430 |
| 4,364,842 | 12/1982 | McDaniel et al. | 252/430 |
| 4,381,382 | 4/1983 | Shipley et al. | 526/97 |
| 4,397,765 | 8/1983 | McDaniel | 252/430 |
| 4,461,873 | 7/1984 | Bailey et al. | 525/240 |
| 4,806,513 | 2/1989 | McDaniel et al. | 502/107 |

*Primary Examiner*—Patrick P. Garvin
*Assistant Examiner*—Brent M. Peebles
*Attorney, Agent, or Firm*—Laney, Dougherty, Hessin & Beavers

[57] ABSTRACT

Olefinic polymer exhibiting high environmental stress crack resistance are produced by contacting the olefin charge stock in a single reactor with a compatible mix of two transition metal catalyst systems. One component of the catalyst system comprises chromium oxide supported on an aluminophosphate material. Hydrogen can be used as adjuvant for the hexavalent chromium component of the catalyst mixture. The second catalyst component consists essentially of a beta-stabilized tetrahydrocarbyl zirconium compound supported on inorganic support material. The catalysts can be premixed before use in the reactor, or can be added to the reactor separately. A suitable cocatalyst can be utilized.

10 Claims, 1 Drawing Sheet

METHOD FOR PRODUCING OLEFIN POLYMER BLENDS UTILIZING A CHROMIUM-ZIRCONIUM DUAL CATALYST SYSTEM

BACKGROUND OF THE INVENTION

1. Field Of The Invention

This invention relates to a process for making mixtures of olefin polymers and copolymers in a single reactor by in-situ contact of one or more olefinic compounds with a mixture of two catalysts comprising a supported hexavalent chromium catalyst, and a supported beta-stabilized, tetrahydrocarbyl zirconium.

2. Brief Description Of The Prior Art

In U.S. Pat. No. 4,806,513, issued to McDaniel et al a process is disclosed in which olefin is polymerized using a binary catalyst system to yield a mixture of polymers having a bimodal molecular weight distribution, and which exhibits good environmental stress crack resistance and high stiffness. The polymers are produced concurrently in a single reactor. The dual or binary catalyst system includes chromium on silicated alumina, which is further fluorided and/or phosphated. Those catalysts can be used in combination with an organochromium compound on aluminophosphate, or in combination with a zirconium catalyst system. In one of the binary catalyst systems, hexavalent chromium/aluminum phosphate is used as one of the catalysts, and chromium on silicated fluorided alumina is used as the other. This combination of catalysts, when used to polymerize olefins, yields a blend of polymers having a bimodal molecular weight distribution which exhibits good environmental stress crack resistance and good stiffness.

U.S. Pat. No. 4,056,669 teaches the use of tetrabenzyl zirconium supported on alumina as a polymerization catalyst for polymerizing olefins.

It is also known to use phosphated alumina as a hexavalent chromium catalyst support, and such is disclosed in U.S. Pat. No. 4,397,765. Trihydrocarbyl boron compounds can be utilized as cocatalysts. This patent also discloses the production of polyolefins of high melt index, and improved density and stress crack resistance when a high P/Al atomic ratio is characteristic of an aluminum phosphate support material.

A catalyst system used for olefin polymerization is also disclosed in U.S. Pat. No. 4,364,842. In this catalyst system, hexavalent chromium on an aluminum phosphate support is the catalyst employed, and it is utilized with a cocatalyst which is a boron compound selected from trialkyl boron compounds, boron alkoxides and mixtures thereof.

The disclosure of U.S. Pat. No. 4,364,841 is similar to that of U.S. Pat. No. 4,364,842, but in this patent the supported chromium is in the xerovalent state.

It is also known from the prior art that certain advantages are derived from the blending of a high molecular weight olefinic polymer with a low molecular weight olefinic polymer. The polymers are separately produced with a Ziegler catalyst system, and are then physically blended after production. The advantages of such blending, the procedures for blending and the properties of such blends are described in U.S. Pat. No. 4,461,873.

Another dual catalyst mixture is described in U.S. Pat. No. 4,285,834. In this system, at least two independently supported catalysts are employed in a single reactor. At least one of these is an inorganic halide supported on titanium and/or vanadium Ziegler-type catalyst. The other of the two catalysts which is included in this system is a hexavalent chromium compound supported on an inorganic oxide. This catalyst system is particularly suited for polymerizing one or more α-olefin compounds. In the process described in U.S. Pat. No. 4,285,834, the independently supported catalysts are mixed either just prior to introduction into the reaction zone, or they may be added separately and concurrently to the polymerization vessel containing the olefinic material to be polymerized. In this system, polymerization is preferably carried out under solution polymerization conditions.

SUMMARY OF THE INVENTION

This invention relates to a process for preparing a blend of polyethylene polymers (polyolefin polymers or olefin copolymers) having an unusual combination of properties, namely high stiffness and high stress crack resistance. The polymers are made utilizing a dual component catalyst system featuring, as one of the catalyst components, a hexavalent chromium compound on an aluminum phosphate support in which the weight ratio of phosphorus to aluminum is from about 0.5:1 to about 0.9:1. A supported organo-zirconium compound, preferably beta-stabilized tetrahydrocarbyl zirconium, is the other catalyst. The most preferred zirconium compounds are beta-stabilized tetraalkylzirconium compounds. The polymerization catalyst component, hexavalent chromium supported on aluminum phosphate (P/Al 0.5 to 0.9) responds quite differently to hydrogen, and is substantially different in its temperature sensitivity, from the hydrogen response and temperature sensitivity of the olefin polymerization catalyst constituted by the zirconium compound supported on phosphated alumina. Each of these catalysts yields a polyethylene resin differing greatly in molecular weight from the polymer produced by the other catalyst.

We have determined that the two catalyst systems—hexavalent chromium supported on aluminum phosphate, and a tetrahydrocarbyl zirconium catalyst—are compatible and can be concurrently used in an in-situ polymerization reaction in a single reactor to produce polyolefin blends having very broad molecular weight distributions and other desirable properties. In accordance with the present invention, the two catalyst types are either preblended, or they are mixed in a single reactor concurrently with the polymerization reaction, to polymerize olefin to yield polymer blends having unique, and to some extent, customized properties, depending upon the ratios in which the catalysts are blended and selective variation of other reaction conditions.

The mixture of the two described catalysts employed in the invention may be a physical one where the two supported catalysts are simply physically shaken together, or blended after supporting the chromium catalyst on its respective support material, and after supporting the zirconium catalyst on its support material. Alternatively, the mixture of catalysts may be more intimate, as where the hexavalent chromium and tetrabenzyl zirconium are supported on a single aluminum phosphate support material. As yet another alternative, the two catalysts may be introduced independently to the reactor. The latter method is presently preferred.

The polymerization reaction carried out using the dual catalyst system of the invention can be carried out using solution polymerization, but is preferably carried out using particle-form or slurry polymerization. Thus, the temperature employed is broadly from about 100° F. to about 300° F., and the pressure is broadly from about 100 psig to about 770 psig. During polymerization, the catalyst is suspended in an organic diluent medium, added as needed to maintain the catalyst is suspension throughout the polymerization process.

An advantage of the present invention is the production of a polymer blend characterized in having improved Environmental Stress Crack Resistance (ESCR) for a given density and stiffness than a polymer made utilizing a supported hexavalent chromium catalyst alone.

An additional advantage of the invention is to provide a dual catalyst feed system which can be used for "on stream" control of polymer properties.

Another object of the invention is to employ a dual catalyst system to obtain an intimate bimodal mixture of high and low molecular weight polymers without expensive later blending of separately made polymers.

Another object of the invention is to provide a method for changing the composition of copolymers yielded by a polymerization process merely by changing catalyst ratios in a dual catalyst system rather than comonomer ratios.

Another object of the invention is to prepare a blend of polymers having the unusual property of having both high stiffness and high stress crack resistance.

Another object of the invention is to prepare polymer blends which have good properties for use in the manufacture of film grade polyethylene.

GENERAL DESCRIPTION OF THE DRAWINGS

Figure 1:
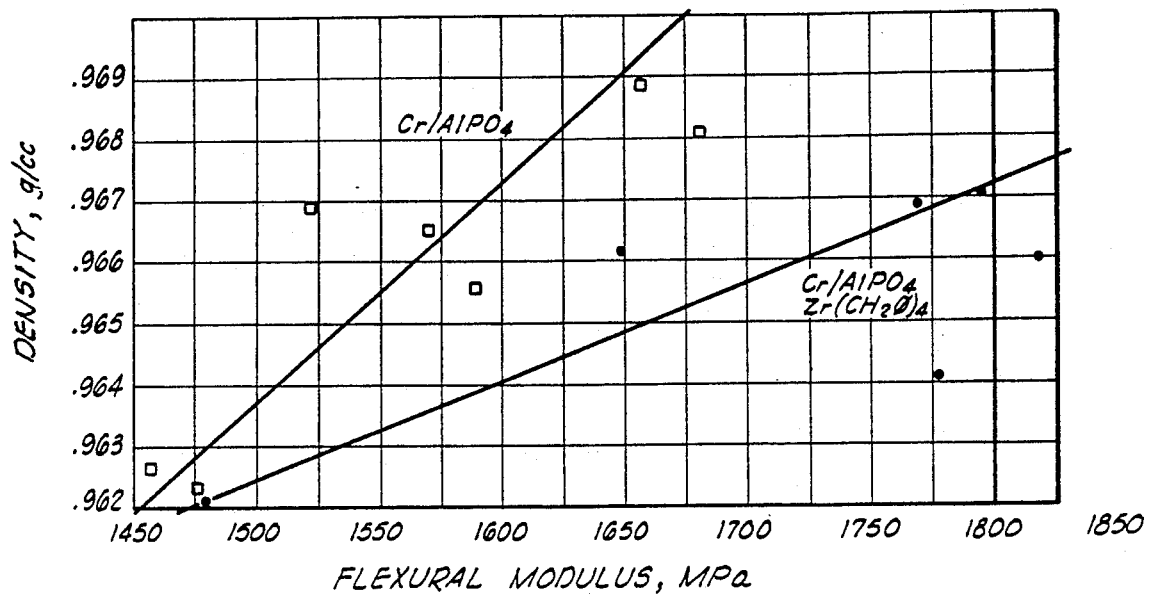
FIG. 1 is a graph in which the flexural modulus of certain polymers and polymer blends is plotted on the abscissa, and the density of such polymers and polymer blends is graphed on the ordinate axis.
Figure 2:
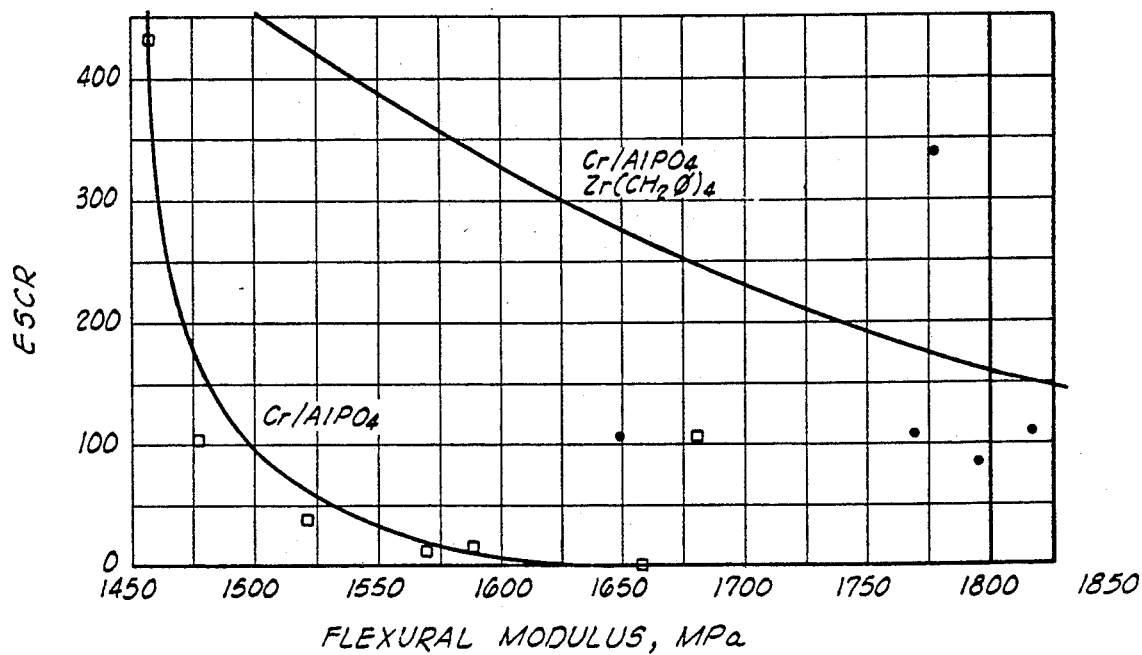
FIG. 2 is a graph in which the structural modulus of certain polymers and polymer blends is plotted on the abscissa, and the Environmental Stress Crack Resistance (ESCR) is plotted on the ordinate axis.

In general, in FIGS. 1 and 2, blends prepared by the method of the present invention, and using the dual catalyst system of the invention, are compared, in the parameters or properties described, with polymers prepared from the polymerization of ethylene, and using only the hexavalent chromium over aluminum phosphate catalyst ($Cr^{+6}/AlPO_4$).

DETAILED DESCRIPTION OF A PREFERRED EMBODIMENT OF THE INVENTION

The dual catalyst system of the invention includes a first catalyst which is a hexavalent chromium compound on an aluminum phosphate support, and a second catalyst which is a beta-stabilized tetrahydrocarbyl zirconium compound on a suitable solid inorganic oxide compound, which is preferably alumina or phosphated alumina.

The properties of the hexavalent chromium-/aluminum phosphate ($Cr^{+6}/AlPO_4$) catalyst and its mode of use are generally well understood in the art. One may refer, for example, to U.S. Pat. No. 4,364,841 which is incorporated herein by reference.

There are several methods of preparing the aluminum phosphate base or supporting material. Any of these methods can be used. A few of these are here described.

First, conventional techniques as disclosed in Hill et al, U.S. Pat. No. 4,219,444, can be used. The disclosure of this patent is incorporated herein by reference. In this method an aluminum salt is combined with a source of phosphate ions in an aqueous medium and neutralized with a neutralizing agent to give a hydrogel. Alternatively, a polar organic solvent can be used instead of the aqueous medium.

The second method for forming the aluminum phosphate base of the chromium catalyst of this invention is to combine an aluminum alkoxide with phosphoric acid to directly yield a hydrogel, as disclosed in Pine U.S. Pat. No. 3,904,550, the disclosure of which is incorporated by reference.

Third, an aluminum salt which will melt can be used. The source of phosphate ions is combined with such aluminum salt melt and the whole is then neutralized to give the hydrogel. Generally those aluminum salts with a sufficiently low melting point are hydrated. Orthophosphoric acid, orthophosphates such as monoammonium phosphate and diammonium hydrogen phosphate, or mixtures of monoammonium and diammonium phosphate, are preferred sources of phosphate ions. The source phosphate ion can be the same as in the first method of preparation described above. In a variation of this third method, a concentrated syrup of an aluminum salt is used.

Alternatively, in method three and possibly method one, the aluminophosphate composition can be only partially neutralized, and then allowed to sit as a strongly acid composition until gellation occurs spontaneously.

In the preparations involving an aqueous medium, it is preferred to remove water by azeotropic distillation or by washing with a volatile, water-miscible, low surface tension organic liquid. In the techniques not employing water or a solvent, any small amount of water carried over from water of hydration, or from the base used in the neutralization, can be removed by conventional spray drying, tray drying or oven drying, thus avoiding the necessity for azeotropic distillation, or of washing with a volatile oxygen-containing water-miscible solvent. After removal of water in this manner, the gel is preferably dried under mild conditions, for instance by heating at a temperature of from about 25° C. to about 110° C., preferably under vacuum.

It may be desirable in some instances to coprecipitate other materials with the phosphate or have other materials present during the gellation. For instance, the supported chromium compound, such as chromium nitrate, can be introduced with the support material forming reactants.

It is frequently beneficial to introduce a small amount of a boron compound into the melt to be coprecipitated with the aluminum phosphate. Suitable boron compounds include borates such as ammonium borate. By coprecipitated, as it relates to the boron compound in the context of the present discussion, it is meant that the aluminum phosphate is formed into a true hydrogel in the presence of the boron compound. The amount of boron compound present when the aluminum phosphate is gelled can vary widely, but it is generally used in an amount so as to give from about 1 to about 30 mole percent boron compound, based on the moles of phosphate.

The neutralization in the first and third methods of preparing the aluminum phosphate support can be carried out either by adding the acid phase to the base phase or vice versa (or by adding both to a third vessel). One suitable practice is to drip the acid phase into the base phase. This results in the production of small spheres or balls of the orthophosphate, particularly with the third method where the melt of aluminum salt and source of phosphate ios are dripped or sprayed or otherwise slowly added to a large excess of ammonium hydroxide. The spheres are subsequently collected, washed, dried and calcined.

In any of the methods of preparing the aluminum phosphate support which are used, the aluminum and phosphorus components are selected so as to give an atom ratio of phosphorus to aluminum within the range of from 0.2:1 to about 1.1:1, and preferably 0.5:1 to 0.9:1.

The chromium compound can be incorporated on the base in any of the ways well known in the art. Thus, the chromium compound can be coprecipitated, as referred to above, or it can be added to the hydrogel after its formation. For example, a water soluble chromium compound, such as chromium nitrate, chromium acetate or chromium oxide can be added to the hydrogel. Alternatively, a chromium compound soluble in an anhydrous solvent, such as hydrocarbon, can be used to impregnate a xerogel prior to activation. (The term xerogel is used to refer to the predominantly amorphous gel resulting from the removal of free water from the hydrogel). Chromium compounds useful for such anhydrous impregnation include, inter alia, tertiarybutylchromate, chromium (III) acetylacetonate and diamine chromium (O). The chromium compounds are used in amounts sufficient to give 0.001 to 10, preferably 0.1 to 5, and most preferably about 1 weight percent to about 3 weight percent of chromium based on the weight of the xerogel base. Where a hydrocarbon solvent is used to emplace the chromium compound on the support, a sufficient amount of the solution is used to completely wet the support and to fill the porous structure to insure even distribution of the metal compound on the support.

The chromium compound placed on the support can be any compound in which chromium is in, or convertible to, the hexavalent state, and can be introduced any time prior to activation. For instance, a hydrocarbon solution of a material such as tertiarybutyl chromate can be used to impregnate the xerogel, or an aqueous solution of a chromium compound, such as $CrO_3$ (chromium trioxide), chromium acetate or chromium nitrate, can be added to the hydrogel before drying, or chromium can be coprecipitated, along with low phosphorus aluminum phosphate.

The activation of the gel can be carried out at temperatures of from about 300° C. to about 800° C., preferably 500° C. to about 800° C., more preferably 600° C. to about 800° C. The activating ambient can be any oxidizing ambient, but for convenience and economy, air is preferred. The chromium is at least predominantly in the hexavalent state after activation. Times of 5 minutes to 24 hours, preferably 0.5 to 10 hours, are suitable for the activation or calcining step.

The second catalyst component in the dual catalyst system of the invention is a supported organo-zirconium compound, and more specifically, is preferably a beta-stabilized tetraalkylzirconium compound supported on a solid inorganic support metal. Examples of suitable zirconium compounds include: tetrabenzyl zirconium, tetrabutyl zirconium, tetraisobutyl zirconium, tetraneopentyl zirconium, tetra (trimethyl-silylmethyl) zirconium, and alkyl substituted derivatives. One especially useful beta-stabilized tetrahydrocarbyl compound is tetrabenzyl zirconium. The inorganic support material is, in general, a solid inorganic metal oxide. Alumina and phosphated alumina are preferred supports for the zirconium compound, and in general, the support can be conditioned and the zirconium incorporated or impregnated therein according to conventional and well understood methods.

The alumina which is utilized in the invention as a support material can also contain minor amounts of other ingredients which do not adversely affect the quality of the final supported zirconium catalyst, but it is generally essentially pure alumina, or phosphated alumina as hereinafter described. Preferably, the alumina is particulate alumina which is free of adsorbed water, and has a particle size diameter between about $20\mu$ and about $200\mu$. Removal of adsorbed water can be accomplished by heating.

A preferred embodiment of this invention entails the use of a phosphated alumina support material for supporting tetrabenzyl zirconium. The phosphating agent employed may be incorporated in an organic water-miscible liquid, such as an alcohol, and used to treat an alumina hydrogel or a xerogel. If the starting material is a hydrogel, then the organic liquid/phosphating agent composition effects both the conversion of the hydrogel to a xerogel, and provides the phosphating level desired. More specifically, if a hydrogel is used, the hydrogel may be washed with water, then with an organic liquid, such as isoamyl alcohol or methanol, containing the phosphating agent, such as phosphoric acid, then filtered and the solvent allowed to evaporate. Alternatively, the alumina gel can be treated with vapor of the phosphating agent.

The phosphating agent is preferably used in an amount to react with the alumina so as to give a P/Al atom ratio of the reaction product on the surface of from about 0.01:1 to about 0.3:1, and preferably from about 0.05:1 to about 0.2:1. In other words, the phosphorus component is added in an amount to give from one to thirty mole percent, and preferably from five to twenty mole percent, of the phosphorus compound incorporated therein based on the total moles of aluminum. The phosphating of the alumina is usually carried out after the alumina has been calcined in air at 400° C. to 700° C. The phosphating treatment is generally carried out at a temperature of from about 25° C. to about 100° C., and preferably from room temperature to the boiling point of the solvent, if a phosphate solution is used, and over a time of from one minute to about two hours, preferably two minutes to thirty minutes. Typically, a methanolic solution of $H_3PO_4$ is used to phosphate the alumina. The alumina, as well as the aluminate prepared in the manner described, can be activated with a temperature from about 400° C. to about 800° C., and preferably from about 500° C. to about 700° C. The time of activation at the described temperatures can last from 1 minute to 48 hours, but 0.5 hours to 10 hours is a preferred period for carrying out the activation. Activation can be carried out at any oxidizing ambient, but is preferably carried out in air.

The dispersion of the organo-zirconium compound on the alumina or phosphated alumina support can be readily accomplished by conventional impregnation methods, such as, for example, using organic solvents such as decalin, toluene, benzene, isooctane or hexane, to dissolve the zirconium compound and adding it to the dried alumina supporting material while stirring, and then recover the coated particles by allowing the slurry to settle and syphoning off the supernatant liquid. A typical product will contain from about 0.1 to about 0.5 m/mole of tetrabenzyl zirconium per gram of alumina.

The catalyst of this invention can be used in conjunction with a cocatalyst if desired, and for the purpose of customizing the properties of the polymers produced. Additionally, hydrogen gas can be used as a useful adjuvant, and this will be subsequently discussed in greater detail.

Suitable cocatalysts for use with the dual catalyst system of the invention include various trihydrocarbylborane compounds and trialkylaluminum compounds. The most preferred borane compounds are tri-n-butylborane, tripropylborane and triethylborane (TEB). Other suitable borane cocatalyst compounds include trialkylborane compounds broadly, and particularly those having alkyl groups of from 1 to 12 carbon atoms, and most preferably, those having from 2 to 5 carbon atoms. Triarylborane compounds such as triphenylborane can be used. Of the trihydrocarbylaluminum compounds, those in which the hydrocarbyl radicals contain from 1 to 12 carbon atoms are suitable, and preferred compounds include triethylaluminum and tripropylaluminum.

The cocatalyst, when it is utilized, is provided in an amount which is within the range from about 0.05 to about 25, and preferably from about 2 to about 10, parts per million, based on the solvent or diluent in those systems employing a solvent or diluent, and based on the total reactor contents and systems which do not employ a solvent or diluent. Based on the amount of chromium in the hexavalent chromium/AlPO$_4$ component of the dual catalyst system, the cocatalysts are used in an amount so as to give from about 0.1 to about 3, and preferably from about 0.3 to about 2 times as much borane, by weight, as chromium, by weight.

The effect of the use of the boron cocatalyst in the dual catalyst system of the invention is to give higher density polymer blends than when the dual catalyst system is used with no cocatalyst. Productivity and Melt Index (MI) also generally increase with increasing boron cocatalyst.

The cocatalyst, when one is employed, can be premixed with the dual catalyst of the invention, or it can be introduced into the polymerization reactor as a separate stream. The latter procedure is preferred.

The two principal catalysts making up the dual catalyst system of the invention can be brought into the polymerization reaction zone in several ways. The two catalyst types can be preblended in the dry state simply by mixing the solid particles of the catalyst, or they can be preblended in a common and mutual solvent. They can also be mixed within the reactor by addition to the reactor concurrently with the addition of the monomer to be polymerized, so that the addition of the catalyst components occurs separately and concurrently to a single reactor in the ongoing of the polymerization reaction. Finally, the two catalysts can also be incorporated upon a single support, the preferred support being the described aluminum phosphate support material.

The ratio in which the two catalyst components are mixed when they are used in the polymerization reaction is susceptible to wide variation, and is a factor of control in customizing the properties of the finished polymer blend. The range of catalyst ratios employed is limited only by a significant change in the properties of the polymer that would be produced by the second catalyst. In general, when the dual catalyst system is utilized, it is preferred that the atomic ratio of zirconium to chromium in the dual catalyst system be from about 10:1 to about 1:10, with the most preferred ratio being from about 6:1 to about 1:1.

In one method of preparing the dual catalyst system used in the invention, the independently supported catalysts are physically mixed together just prior to entering the reaction zone or vessel. Preferably, however, they are fed or added separately to the polymerization zone or vessel containing the olefinic material to be polymerized.

The contacting of monomers with the catalyst system can be effected by any of the techniques known in the art of solid catalysts. A convenient method is to suspend the catalyst in the liquid diluent and to agitate the reaction mixture, thus maintaining the catalyst as a solid suspension in the diluent. Other known catalytic contacting methods, such as fixed bed, fluidized bed and gravitating bed, can also be used.

The polymerization process according to the present invention employing the dual catalyst system, with or without the cocatalyst described above, can be performed either batch wise or continuously. In a batch process, a stirred autoclave is prepared by first purging with an inert gas, such as nitrogen or argon. When the catalyst is used with the cocatalyst, either the dual catalyst can be charged to the reactor first, or they can be charged separately or simultaneously through an entry port, and the cocatalyst can then be charged at the same time or subsequently. After closing the entry port to the reactor, a desired quantity of hydrogen can be added to control the molecular weight of the resulting polymer blend, as is well understood in the art. Although the zirconium component of the dual catalyst system is not notably responsive to the hydrogen addition, the hexavalent chromium catalyst is particularly sensitive thereto and responds in a well understood way, in terms of the molecular weight of the resulting polymer contribution of this specific one of the catalysts in the system.

The reaction can be carried out so that polymer is formed in solution, and the procedure followed is then that which is generally recognized as the procedure known as solution polymerization. Alternatively, in a preferred practice according to the present invention, the polymer is produced in the form of small solid particles which are suspended in a slurry in a liquid medium in which the polymerization is carried out.

More particularly, in the preferred particle-form or slurry polymerization by which polymers are produced in accordance with a preferred embodiment of this invention, the catalyst is suspended in an organic diluent while the same is preferably agitated by a suitable stirrer. This organic diluent is more particularly, a hydrocarbon compound containing from three to twelve carbon atoms. The diluent is inert to the catalysts and to the polymer. Suitable hydrocarbon diluents include isobutane, propane, n-butane, n-pentane and n-hexane and isooctane. Other inert diluents in which the slurry process can be carried out include, in addition to those mentioned, cycloparaffin and aromatic hydrocarbons, such as cyclohexane, benzene, toluene, methylcyclopentane and xylene. Isobutane is particularly suitable.

Generally, in the slurry polymerization of ethylene homopolymer and predominantly ethylene copolymer systems, the feasible temperature range is from about 70° C. to about 110° C. The temperature utilized in slurry or particle-form polymerization is more typically from about 90° C. to 105° C. The pressure utilized is sufficient to maintain the medium in the liquid phase, including a portion of the monomer to be polymerized. The pressure will generally be in the range of from about 100 psig to 700 psig. A very suitable pressure is about 550 psig. Where particle-form polymerization is carried out, a catalyst concentration of from about 0.001 weight percent to about 1.0 weight percent, based on the total weight of the reactor contents, is employed.

During polymerization, it is desirable to stir the reactor contents to obtain better temperature control and maintain uniform polymerization mixtures throughout the polymerization zone.

Olefins which are suitably homopolymerized or copolymerized in the practice of this invention are generally $\alpha$-monoolefins and $\alpha$-diolefins having from 2 to about 8 carbon atoms. Illustratively, such olefins include, for example, ethylene, propylene, butene-1, butadiene, pentene-1, 3-methylbutene-1, 4-methylpentene-1, hexene-1, and mixtures thereof. It will be understood that $\alpha$-olefins may be copolymerized with one or more other $\alpha$-olefins, or with minor amounts, i.e. up to about 25 weight percent, of other polymerizable ethylenically unsaturated monomers, such as styrene.

The polymers prepared with the catalyst of this invention are normally solid polymers of at least one mono-1-olefin, containing from 2 to about 8 carbon atoms per molecule. The catalyst of the invention are particularly useful for the preparation of high melt flow ethylene polymers. These preferred polymers are normally solid homopolymers of ethylene, or copolymers of ethylene with another mono-1-olefin containing 3 to 8 carbon atoms per molecule. Propylene, 1-butene, 1-pentene and 1-hexene are especially preferred comonomers for use with ethylene.

As previously indicated, hydrogen can be used as an adjuvant to decrease the molecular weight of the polymers produced with the dual catalyst system of this invention, if desired. Partial pressures of hydrogen, when hydrogen is used, can be within the range of 5 psig to 120 psig, preferably 20 psig to 75 psig. In different words, the hydrogen is employed in concentrations ranging from about 0.1 up to about 2.0 mole percent of the diluent. The hydrogen can be added with a monomer stream to the polymerization vessel, or separately added to the vessel before or after the addition of the monomer.

In the following examples, certain tests of polymers and polymer blends are alluded to, and various properties of these resins are set forth and compared. These parameters were determined by the use of the following standard testing procedures:

The Environmental Stress Crack Resistance (ESCR) is determined in accordance with ASTM D 1693-60, Condition A.

The Melt Index (MI) is determined by the test procedures described in ASTM D 1238-65T, load of 2.16 kg.

High Load Melt Index (HLMI) is determined by ASTM D 1238-65T, load of 21.6 kg.

Density (g/cc) is determined by the method described in ASTM D 1505-68.

$M_w$ refers to the weight average molecular weight of the polymer, as determined by size exclusion chromatography (SEC).

$M_n$ is the number average molecular weight, as determined by size exclusion chromatography (SEC).

Flexural modulus (stiffness) is determined by the use of ASTM D 790.

Molecular Weight Distribution, $M_w$-$M_n$, is determined by RDSI (Rheometric Dynamic Spectrophotometer Index).

Heterogeneity Index (HI) = $M_w/M_n$.

EXAMPLE 1

Physical mixtures of the two types of polymers used in the dual polymer system of the present invention can be conveniently blended by roll-milling. This method of blending was employed in a series of tests carried out to determine the effect of blend ratios of the two catalysts on the various resin properties of the blends resulting therefrom. The data developed during these tests are set forth in Table I. Here the polymerization results are shown for several blends of the two catalysts of this invention. There are also shown in this table, under the heading "Control Runs" the properties of certain typical polymers produced using only the hexavalent chromium on aluminum phosphate catalyst.

The group of polymerization runs at the left of Table I is a group of runs made using the chromium component of the dual catalyst system. The next group to the right of this series of chromium catalyst runs is a group of polymerization runs using only the zirconium component of the catalyst system. In the case of the runs carried out with the hexavalent chromium-on-aluminum phosphate catalyst, the polymerization runs were made at 105° C. with 50 psig of hydrogen with the catalyst suspended in isobutane, and using 8 ppm of tetraethylborane as a cocatalyst. The Melt Index (MI) of the polymers developed by this series of chromium catalyst runs ranged from about 20 to about 200, depending on the hydrogen concentration used in each of the runs. When these polymers are compared with those produced using the tetrabenzyl zirconium on phosphated alumina catalyst constituting the other component of the dual catalyst system, it will be noted that the zirconium component yields a high molecular weight component having a High Load Melt Index (HLMI) of between 0.0 and 3.0.

Finally, in Table I, there are shown the properties of polymers made with a blended mixture of the two catalysts with the amount of each of the two catalysts used in the catalyst mixture being shown in the columns headed "Amount" and appearing under each of the two respective catalysts general headings. Thus, the first five runs were each 50/50 blends, whereas the sixth and seventh runs contained 30 g of the chromium component and 50g of the zirconium component.

TABLE I

| | $Cr^{+6}AlPO_4$ Component | | | | $Zr(CH_2O)_4$/P-Alumina | | | | Blended Dual Catalyst Mixture | | | | | |
|---|---|---|---|---|---|---|---|---|---|---|---|---|---|---|
| Run | Catalyst | Amount | MI | HLMI | Catalyst | Amount | MI | HLMI | Blend No. | MI | HLMI | Density | Flex. | ESCR |
| 1 | 71B | 40 g | 188 | High | 76A | 40 g | 0 | 2.7 | 43A | .25 | 62 | .9662 | 1649 | 109 |
| 2 | 70B | 40 g | 85 | High | 76B | 40 g | 0 | 0 | 43B | 0 | 4.9 | .9620 | 1478 | >1000 |
| 3 | 71B | 40 g | 88 | High | 47B | 40 g | 0 | .90 | 43C | .11 | 24 | .9669 | 1770 | 111 |
| 4 | 82A | 40 g | 36 | High | 80A | 40 g | 0 | 1.0 | 46A | .11 | 23 | .9671 | 1794 | 86 |
| 5 | 81B | 40 g | 18 | 815 | 81A | 40 g | 0 | .55 | 46B | .07 | 16 | .9662 | 1834 | 105 |

TABLE I-continued

| 6 | 81B | 30 g | 19 | 815 | 81A | 50 g | 0 | .55 | 46C | .03 | 6.6 | .9641 | 1777 | 345 |
| 7 | 82A | 30 g | 36 | High | 80A | 50 g | 0 | 1.0 | 46D | .05 | 9.2 | .9660 | 1867 | 215 |

| | Control Runs (Cr$^{+6}$/AlPO$_4$ Alone) | | | | | |
| --- | --- | --- | --- | --- | --- | --- |
| Run | Catalyst | MI | HLMI | Density | Flex. | ESCR |
| 1 | 46 | .36 | 58 | .9689 | 1666 | BOB |
| 2 | 24 | .12 | 29 | .9681 | 1682 | 110 |
| 3 | 53 | .45 | 53 | .9669 | 1522 | 36 |
| 4 | 41 | .30 | 32 | .9623 | 1476 | 100 |
| 5 | 46 | .06 | 12 | .9656 | 1588 | 16 |
| 6 | 45 | .54 | 60 | .9665 | 1570 | 12 |

When the properties of polymer blends yielded by the dual catalyst mixture, as shown at the right side of Table 1 are observed, and particularly when this data is plotted to yield the graphs shown in FIGS. 1 and 2, it is noted that, as compared to the control resins made with the hexavalent chromium catalyst alone, the graphs show that for a given density, the polymer blends resulting from a blend of the two catalysts in the catalyst system of the invention exhibit a significantly higher stiffness for a given density of the composite polymer. The difference becomes even more pronounced as the polymer density increases.

Perhaps the most remarkable property of the blended resins produced from the dual catalyst system, as contrasted with the hexavalent chromium-aluminum phosphate control runs, is the increased stress crack resistance for a given polymer stiffness. The plot in FIG. 2 shows that the blended resins produced by the process of this invention have stress crack resistant values of from 100 to 300 hours for a stiffness level (as measured by flexural modulus) of 1,750-1,850 NPa, whereas the ESCR of the control resins typically dropped to zero above a flexural modulus of 1,650 NPa.

EXAMPLE 2

Several polymerization runs utilizing the dual catalyst system of the present invention were carried out for the purpose of polymerizing ethylene, and more specifically, for evaluating the effect of adding the two catalysts separately. In these runs, each of the two catalysts, Cr$^{+6}$/AlPO$_4$ and Zr(benzyl)$_4$/P-Al$_2$O$_3$, were separately charged to a 2-liter bench reactor. In each of the runs, the reactor temperature was 100° C. with 8 ppm of tetraethylborane used as a cocatalyst, and with 25 psig of hydrogen added to the reactor. The three runs made with the dual catalyst system were compared to two control runs which were carried out utilizing in one of the control runs, only a supported hexavalent chromium catalyst, and in the other control run, only the tetrabenzyl zirconium supported catalyst.

The results of these runs are set forth in Table II.

TABLE II

| (a) Run | (b) Cr | (c) Zr | (d) Yield/30' | (e) MI | (e) HLMI | (e) Dens. | (e) Flex. | (e) ESCR |
| --- | --- | --- | --- | --- | --- | --- | --- | --- |
| 1 | .139 | .120 | 157 | 13.3 (8.72) | large (large) | 0.9705 (0.9720) | 1850 2000 | BOB (f) BOB |
| 2 | .135 | .300 | 358 | .82 (11) | 67.3 (17.1) | 0.9647 (0.9664) | 1600 1610 | BOB 78 |
| 3 | .082 | .300 | 302 | 2.16 (.17) | 169 (23.3) | 0.9660 (0.9634) | 1670 1760 | BOB 53 |
| CONTROL RUNS | | | | | | | | |
| 4 | .098 | 0 | 110 | 23.5 | large | 0.9714 | 1802 | BOB |
| 5 | 0 | .270 | 118 | 0 | .39 | 0.9555 | 1371 | 1000 |

(a) All runs made at 100° C. with TEB (0.5 wt %) and 25 psig hydrogen added to the reactor.
(b) Weight in grams of Cr$^{+6}$/AlPO$_4$ (P/Al = .9) catalyst charged.
(c) Weight in grams of Zr(Benzyl)$_4$P—Al$_2$O$_3$ catalyst charged.
(d) Yield in grams of polymer produced in a 30 minute run.
(e) Properties reported for both reactor fluff and (in parentheses) roll-milled and chopped material.
(f) Broke on bending.

From Table II, it will be perceived that the polymer blends produced by the polymerization runs there reported generally have good properties. The tetrabenzyl zirconium catalyst mounted on the phosphated alumina support and the hexavalent chromium mounted on aluminum phosphate appear to be perfectly compatible catalysts, since the productivity of the two component system is merely the sum of the individual catalyst productivities. That is, the productivity of each catalyst is not in any way decreased or detrimentally affected by the addition of both of the catalysts to the reaction zone. Moreover, the tetraethylborane cocatalyst used to enhance the chromium system does not appear to interfere with the zirconium system to any discernable degree.

In general, as the data reported in the tables and set forth in the drawing figures demonstrates, the mixing of the two catalyst types in a dual catalyst system appears to beneficially affect the blended polymer which is obtained thereby, as compared to the polymer which is obtained from the hexavalent chromium system alone. Thus the Melt Index (MI), the density and the flexural modulus are all lowered, while a substantial increase in Environmental Stress Cracking Resistance (ESCR) value is observed. These results obtained from the polymer blends data indicate that the concept of a dual catalyst feed system in which both are fed as separate streams to the reactor can be used for "on stream" control of polymer properties.

Although certain embodiments of the invention have been herein described in order to provide adequate information to allow the invention to be practiced by those skilled in the art, various changes in the details pertaining to quantities of materials and process parameters can be made without departure from the basic principles upon which the invention is based. Such changes are considered to be encompassed by the spirit and scope of the invention.

What is claimed is:

1. A process for polymerizing one or more α-olefins which comprises conducting polymerization of said olefins under particle-form suspension polymerization conditions in the presence of a dual catalyst system which includes at least two independently supported catalysts comprising:

a first catalyst consisting essentially of chromium oxide supported on a solid aluminophosphate particulate support; and a beta-stabilized tetrahydrocarbyl zirconium compound supported on an inorganic particulate support material.

2. A process as defined in claim 1 wherein said organic zirconium compound has the formula $Zr(R)_4$ where "R" is a monovalent hydrocarbyl group containing from 1 to 10 carbon atoms.

3. A process as defined in claim 2 wherein ethylene is the olefin polymerized.

4. A process as defined in claim 1 wherein ethylene and one or more α-olefins each containing from 3 to 10 carbon atoms are copolymerized.

5. A process as defined in claim 1 wherein said α-olefins contain from about 4 to about 8 carbon atoms.

6. A process as defined in claim 1 wherein said zirconium compound is tetrabenzyl zirconium.

7. A process as defined in any one of claims 1-6 wherein said zirconium catalyst is made by:

contacting, while stirring, alumina particles calcined at 500°-700° C. for 1-5 hours, under nitrogen, with a hydrocarbon solution of tetrabenzyl zirconium; then allowing the slurry to settle; and separating the supernatant liquid from the settled solid particles.

8. A process as defined in any one of claims 1-6 wherein said polymerization is carried out utilizing a cocatalyst selected from the group consisting of trialkylborane compounds and trialkylaluminum compounds.

9. A process as defined in any one of claims 1-6 wherein the polymerization process is carried out utilizing hydrogen gas as an adjuvant.

10. A process as defined in claim 8 wherein the cocatalyst used is triethylborane.

* * * * *

UNITED STATES PATENT AND TRADEMARK OFFICE
CERTIFICATE OF CORRECTION

PATENT NO. : 5,032,651
DATED : July 16, 1991
INVENTOR(S) : Max P. McDaniel and Paul D. Smith It is certified that error appears in the above-identified patent and that said Letters Patent is hereby corrected as shown below:

In Column 2, line 40, delete "system--" and insert -systems- and delete the "s" at the beginning of line 41.
In Column 3, line 7, delete "is" and insert -in-.
In Column 9, Table 1, in Run 3, under the column marked MI, delete "88" and insert -188-.

Signed and Sealed this

Seventeenth Day of November, 1992

*Attest:*

DOUGLAS B. COMER

*Attesting Officer*  Acting Commissioner of Patents and Trademarks